United States Patent
Mujtaba et al.

(10) Patent No.: US 9,560,598 B2
(45) Date of Patent: Jan. 31, 2017

(54) POWER MANAGEMENT BASED ON ADAPTIVE RECEIVER SELECTION

(71) Applicant: Apple Inc., Cupertino, CA (US)

(72) Inventors: Syed A. Mujtaba, Santa Clara, CA (US); Kee-Bong Song, Santa Clara, CA (US); Youngjae Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 14/018,179

(22) Filed: Sep. 4, 2013

(65) Prior Publication Data

US 2014/0071844 A1    Mar. 13, 2014

Related U.S. Application Data

(60) Provisional application No. 61/698,399, filed on Sep. 7, 2012.

(51) Int. Cl.
*H04W 52/02* (2009.01)
*H04W 52/24* (2009.01)

(52) U.S. Cl.
CPC ......... *H04W 52/028* (2013.01); *H04W 52/241* (2013.01); *H04W 52/243* (2013.01); *H04W 52/0245* (2013.01); *Y02B 60/50* (2013.01)

(58) Field of Classification Search
CPC .......... H04W 52/0251; H04W 52/028; H04W 52/0025; H04W 52/0209; H04W 52/0235; H04W 52/02; H04W 52/0245; H04W 88/02; H04L 41/0833; H04L 12/10; G06F 1/3203; G06F 1/3287; G06F 1/3206;G06F 1/3296; G06F 1/3234; G06F 1/26; G06F 3/1221; Y02B 60/50; Y02B 60/1282; Y02B 60/1278
See application file for complete search history.

(56) References Cited

U.S. PATENT DOCUMENTS

| | | | |
|---|---|---|---|
| 2003/0035403 A1* | 2/2003 | Choi et al. | H04L 1/1887 370/342 |
| 2007/0026839 A1* | 2/2007 | Liang et al. | 455/343.5 |
| 2007/0184811 A1* | 8/2007 | Ballantyne | 455/343.2 |

(Continued)

*Primary Examiner* — Samina Choudhry
*Assistant Examiner* — Peter Chen
(74) *Attorney, Agent, or Firm* — Meyertons, Hood, Kivlin, Kowert & Goetzel, P.C.

(57) ABSTRACT

In order to reduce power consumption of an electronic device during wireless communication, the electronic device may transition between a baseline (simple) receiver and a higher-power advanced receiver based on network conditions and/or environmental conditions. For example, the transition to the advanced receiver may occur when it offers improved communication performance over the baseline receiver, such as when there is significant interference and a high data rate, or when there is significant interference and a signal-to-noise ratio (SNR) is low. Similarly, the transition to the baseline receiver may occur when the capabilities of the advanced receiver are not needed, such as when there is less interference, or when the data rate is lower and the SNR is high. In this way, the electronic device can avoid the added power consumption associated with the advanced receiver except where the communication performance offered by the advanced receiver is needed.

17 Claims, 5 Drawing Sheets

(56) References Cited

U.S. PATENT DOCUMENTS

| | | |
|---|---|---|
| 2007/0263574 A1* | 11/2007 | Lu et al. ........... H04W 52/0261 370/338 |
| 2008/0095263 A1* | 4/2008 | Xu et al. ....................... 375/295 |
| 2008/0130711 A1* | 6/2008 | Catreux-Erceg et al. ......................... H04L 1/20 375/130 |
| 2008/0160988 A1* | 7/2008 | Jami et al. .................... 455/423 |
| 2012/0155385 A1* | 6/2012 | Bencheikh .................... 370/328 |
| 2013/0237171 A1* | 9/2013 | Lindoff et al. .... H04W 52/0261 455/343.1 |
| 2013/0343251 A1* | 12/2013 | Zhang .......................... 370/311 |

\* cited by examiner

POWER MANAGEMENT BASED ON ADAPTIVE RECEIVER SELECTION

CROSS REFERENCE TO RELATED APPLICATION

This application claims priority under 35 U.S.C. §119(e) to U.S. Provisional Application Ser. No. 61/698,399, entitled "Adaptive HSDPA Receiver Selection Criteria," by Syed Aon Mujtaba, Kee-Bong Song, and Youngjae Kim, filed on Sep. 7, 2012, the contents of which are herein incorporated by reference.

BACKGROUND

Field

The described embodiments relate to techniques for reducing the power consumption of electronic devices in a wireless network.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Washington), and/or another type of wireless interface.

Because network and environmental conditions can degrade the performance of wireless communication, many networking subsystems (such as those that support High-Speed Downlink Packet Access or HSDPA) include a baseline (simple) receiver and an advanced receiver. Advanced receivers, such as a minimum-mean-squared-error decision-feedback-equalization (MMSE-DFE) receiver can help eliminate multi-path interference in a single-cell scenario, as well as cancelling neighboring-cell interference in a multi-cell scenario.

The advanced receivers typically consume a significant amount of power compared to baseline receivers, such as a linear minimum-mean-squared-error (L-MMSE) receiver. However, in some network and environmental conditions, the advanced receivers provide little or no gain over the baseline receivers. Consequently, networking subsystems that include an advanced receiver may significantly increase the power consumption and reduce the operating time of the electronic device without improving the communication performance, which can frustrate users and degrade the user experience.

SUMMARY

The described embodiments include an electronic device. This electronic device includes an antenna and a communication circuit, coupled to the antenna, which communicates via wireless communication. The communication circuit includes: a first receiver circuit that detects data in received signals; and a second receiver circuit that detects the data in the received signals, where, during operation, the second receiver circuit has a larger power consumption than the first receiver circuit. Moreover, the electronic device calculates: a metric for signals that interfere with the wireless communication, a metric for a data rate associated with the wireless communication, and a metric for a signal-to-noise ratio (SNR) associated with the wireless communication. Based on a logic condition, the electronic device determines whether to transition the electronic device from a first power state to a second power state by switching from the first receiver circuit to the second receiver circuit. This logic condition may be based on: the metric for the signals and the metric for the data rate, or the metric for the signals and the metric for the SNR.

In some embodiments, the communication circuit calculates: the metric for the signals, the metric for the data rate and the metric for the SNR. Furthermore, the communication circuit determines whether to transition the electronic device from the first power state to the second power state. Alternatively, the electronic device may include: a processor; and memory, where the memory stores a power-management program module that is executed by the processor to manage power consumption of the electronic device. The program module may include: instructions for receiving the metric for the signals, the metric for the data rate, and the metric for the SNR; and instructions for determining whether to transition the electronic device from the first power state to the second power state.

Note that the logic condition may be: the metric for the signals is greater than a first threshold and the metric for the data rate is greater than a second threshold, or the metric for the signals is greater than the first threshold and the metric for the SNR is less than a third threshold.

In some embodiments, the second receiver circuit has improved communication performance than the first receiver circuit.

Moreover, the signals may include: multi-path interference and neighboring-cell interference. Furthermore, the metric for the SNR may be associated with a measured power of a pilot signal and a measured noise over an operating bandwidth in the wireless communication. Additionally, the metric for the data rate may be associated with high-speed-downlink-packet-access (HSDPA) data scheduling.

In some embodiments, if the electronic device transitions to the second power state, the electronic device subsequently determines whether to transition the electronic device from the second power state to the first power state by switching from the second receiver circuit to the first receiver circuit based on a second logic condition. The second logic condition may be based on: the metric for the signals, or the metric for the data rate and the metric for the SNR. For example, the second logic condition may be: the metric for the signals is less than the first threshold, or the metric for the data rate is less than the second threshold and the metric for the SNR is greater than a fourth threshold.

Another embodiment provides an integrated circuit that includes the communication circuit.

Another embodiment provides a computer-program product for use with the electronic device. This computer-program product includes instructions for at least some of the operations performed by the electronic device.

Another embodiment provides a method for managing power consumption of the electronic device. During the method, signals associated with the wireless communication are received. Then, using the first receiver circuit, data in the signals is detected. Moreover, the metric for signals that interfere with the wireless communication, the metric for a data rate associated with the wireless communication, and the metric for the SNR associated with the wireless communication are calculated. Next, whether to transition the electronic device from the first power state to the second power state by switching from the first receiver circuit to the second receiver circuit is determined based on the logic condition. Note that the second receiver circuit has a larger power consumption than the first receiver circuit, and that the logic condition is: the metric for the signals is greater than the first threshold and the metric for the data rate is greater than the second threshold, or the metric for the signals is greater than the first threshold and the metric for the SNR is less than the third threshold.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate reduced power consumption of an electronic device (such as a smartphone) when communicating using wireless communication, the electronic device may transition between a lower power state and a higher power state. In particular, the electronic device may transition between a baseline (simple) receiver and a higher-power advanced receiver based on network conditions and/or environmental conditions (and, more generally, channel conditions). For example, the transition to the advanced receiver may occur when it offers improved communication performance over the baseline receiver, such as when there is significant interference and a high data rate, or when there is significant interference and a signal-to-noise ratio (SNR) is low. Similarly, the transition to the baseline receiver may occur when the capabilities of the advanced receiver are not needed, such as when there is less interference, or when the data rate is lower and the SNR is high. In this way, the electronic device can avoid the added power consumption associated with the advanced receiver except where the communication performance offered by the advanced receiver is needed.

In the discussion that follows, the wireless communication includes cellular-telephone communication protocol in a cellular network, such as a so-called third-generation (3G) communication protocol, a 3.5G communication protocol, 4G communication protocol, etc. For example, the wireless communication may include High-Speed Downlink Packet Access (HSDPA) in the Universal Mobile Telecommunications System from the 3$^{rd}$ Generation Partnership Project in Asia, Europe and North America with data rates up to 42 Mbps or 377 Mbps. However, the communication technique may be used with a wide variety of other communication protocols, such as: Wi-Fi® (from the Wi-Fi Alliance of Austin, Tex.) communication protocol (and, more generally, a wireless communication protocol described in the Institute of Electrical and Electronics Engineers (IEEE) standards 802.11), Bluetooth™ (from the Bluetooth Special Interests Group of Kirkland, Wash.), and/or other types of wireless interfaces.

Figure 1:
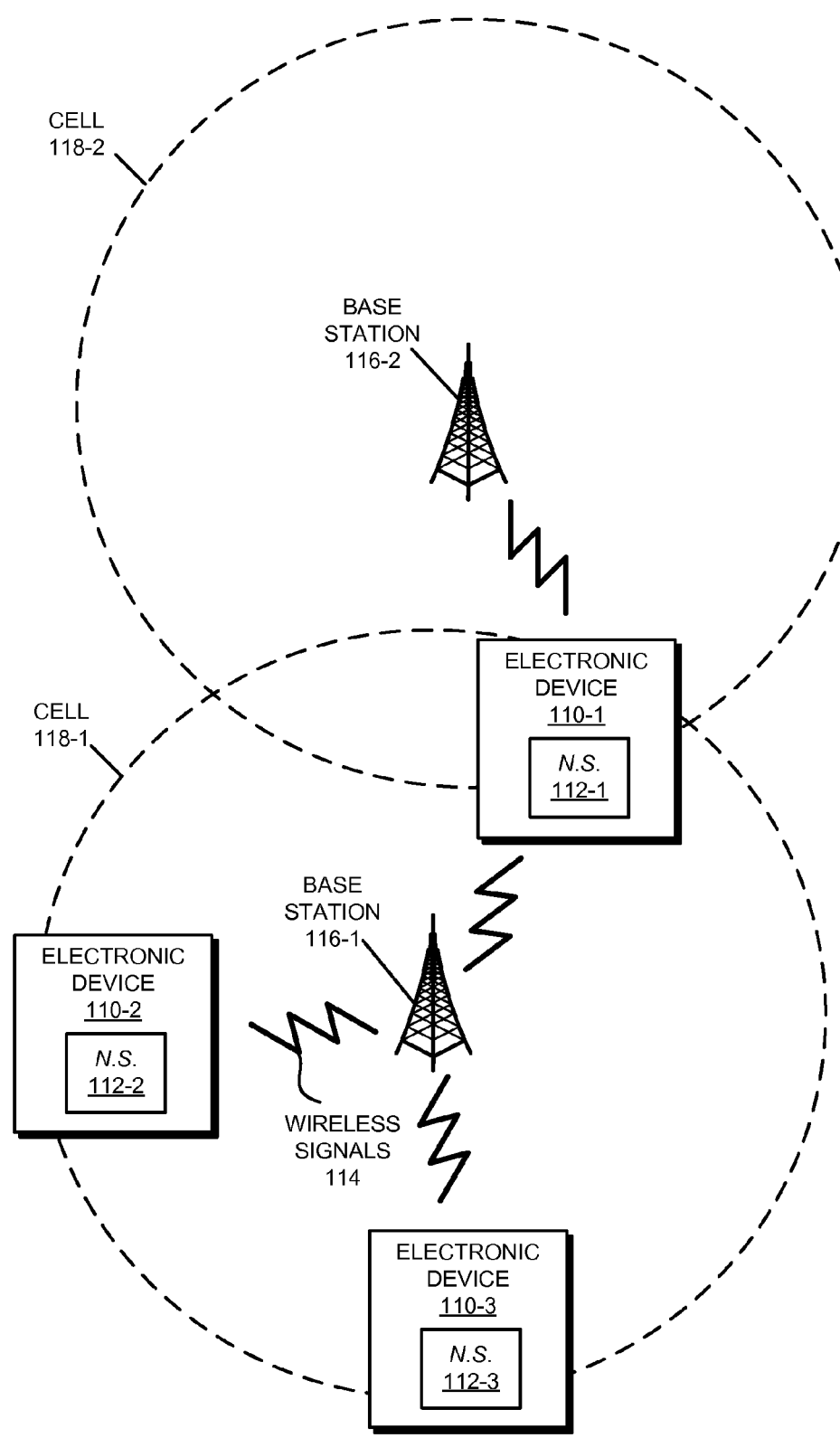
FIG. 1 is a block diagram illustrating electronic devices wirelessly communicating in accordance with an embodiment of the present disclosure.

The wireless communication between electronic devices is shown in FIG. 1, which presents a block diagram illustrating electronic devices 110 in a cellular network. In particular, these electronic devices may wirelessly communicate packets with each other. This communication may occur via one or more base stations 116 that currently provide cellular service to electronic devices 110 in cells 118.

However, the quality or communication performance of the wireless communication can vary depending on network (or channel) conditions and/or environmental conditions. For example, the communication performance with electronic devices 110 may vary depending on the data rate of the wireless communication. Therefore, the communication performance may vary depending on the data rate associated with HSDPA data scheduling. Similarly, the SNR associated with the wireless communication may vary over time, such as based on the distance of electronic devices 110 from the one or more base stations 116 that currently provide cellular service to electronic devices 110, or if one of electronic devices 110 is in a weaker one of cells 118.

In addition, interference, such as multi-path interference and neighboring-cell interference, can degrade the communication performance. Therefore, electronic device 110-1, which is at an intersection of cells 118, may have more interference (and, thus, reduced communication performance) than electronic device 110-2 or 110-3.

Figure 4:
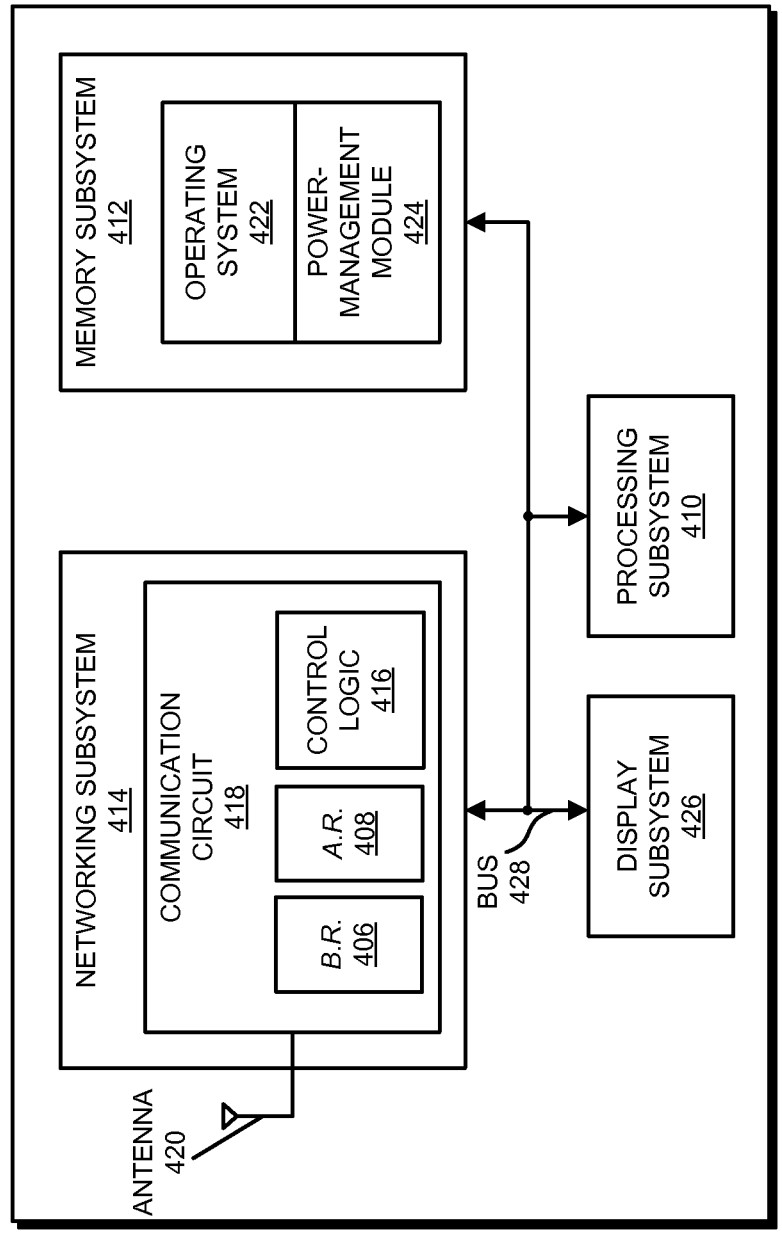
FIG. 4 is a block diagram illustrating one of the electronic devices of FIG. 1 in accordance with an embodiment of the present disclosure.

As described further below with reference to FIG. 4, each of electronic devices 110 may include subsystems (such as a networking subsystem, a memory subsystem and a processor subsystem) that dynamically address these communication challenges. In particular, electronic devices 110 may include radios in networking subsystems (N.S.) 112. More generally, electronic devices 110 can include (or can be included within) any electronic devices with the networking subsystems that enable electronic devices 110 to wirelessly communicate with another electronic device. This can comprise: transmitting messages on wireless channels to enable electronic devices to make initial contact, followed by exchanging subsequent messages to establish a connection; and transmitting and receiving packets or frames via the connection, etc. As can be seen in FIG. 1, wireless signals 114 (represented by jagged lines) are communicated with base stations 116 in cells 118 using radios in electronic devices 110.

In the described embodiments, processing a packet or frame in electronic devices 110 includes: receiving wireless signals 114 with the packet or frame; decoding/extracting the packet or frame from received wireless signals 114 to acquire the packet or frame; and processing the packet or frame to determine information contained in the packet or frame (such as the command or the information in the payload).

As described further below with reference to FIG. 5, because of the effects of the network conditions and/or the environmental conditions, networking subsystems 112 may include multiple receivers, such as a baseline receiver and an advanced receiver. For example, the baseline receiver may include a linear minimum-mean-squared-error (L-MMSE) receiver, and the advanced receiver may include a minimum-mean-squared-error decision-feedback-equalization (MMSE-DFE) receiver. However, a wide variety of receivers can be used. In the discussion that follows, one of these receivers may be used at a given time (i.e., one is 'active' or turned on and the other is 'inactive' or, at least in part, turned off). However, in other embodiments more than one receiver is used at a given time. For example, the receivers may be used independently of each other or in conjunction with each other (such as a cascaded receiver).

In general, the advanced receiver offers improved communication performance (such as reduced mean-square error, a reduced bit-error rate, etc.) in the presence of certain network conditions and/or environmental conditions, such as multi-path interference in a single-cell scenario or neighboring-cell interference in a multi-cell scenario. However, the improved communication performance of the advanced receiver typically results in significantly higher power consumption than the baseline receiver. Consequently, networking subsystems 112 assess the network conditions and/or environmental conditions and dynamically transition between the baseline receiver and the advanced receiver, as needed, thereby reducing power consumption of electronic devices 110 to increase battery life (and, more generally, the time between recharging of power sources).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
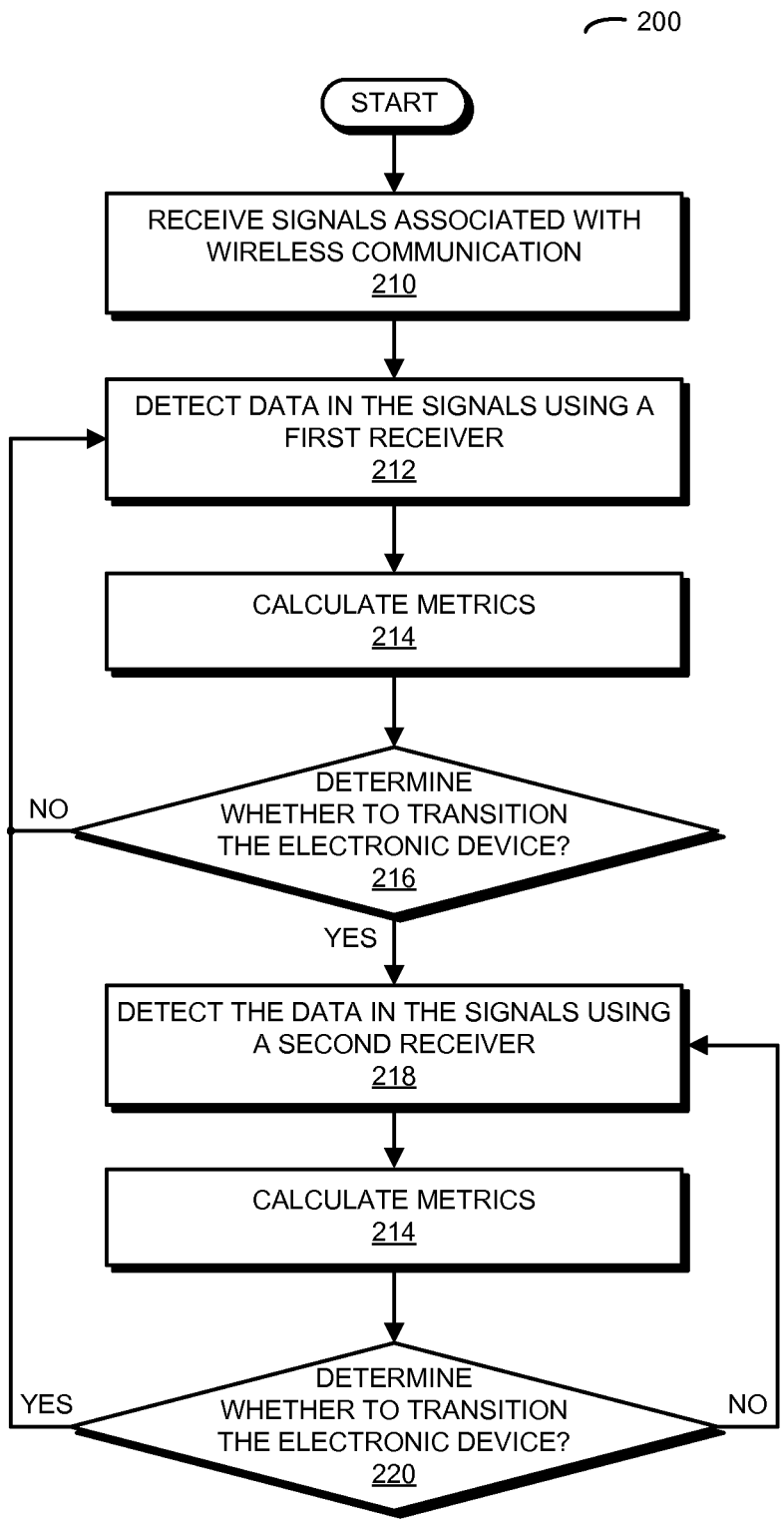
FIG. 2 is a flow diagram illustrating a method for managing power consumption of one of the electronic devices in FIG. 1 in accordance with an embodiment of the present disclosure.

Power management of a given one of electronic devices 110 may be facilitated using hardware and/or software executing in an environment of the given electronic device that implements the communication technique. The communication technique is shown in FIG. 2, which presents a flow diagram illustrating a method 200 for managing power consumption of an electronic device, which may be performed by electronic device 400 in FIG. 4. During operation, the electronic device receives signals associated with wireless communication (operation 210). Then, the electronic device uses a first receiver circuit (such as a baseline receiver) to detect data in the signals (operation 212).

Moreover, the electronic device calculates metrics (operation 214), including: a metric for signals that interfere with the wireless communication (such as multi-path interference and/or neighboring-cell interference), a metric for a data rate associated with the wireless communication, and a metric for the SNR associated with the wireless communication. For example, the metric for the SNR may be associated with a measured power of an in-band pilot signal and a measured noise over an operating bandwidth in the wireless communication. Furthermore, the metric for the data rate may be associated with HSDPA data scheduling.

Next, the electronic device determines whether to transition the electronic device (operation 216) from a first power state to a second power state by switching from the first receiver circuit to a second receiver circuit (such as the advanced receiver) based on a logic condition. Note that the second receiver circuit has a larger power consumption than the first receiver circuit, and that the logic condition is based on: the metric for the signals and the metric for the data rate, or the metric for the signals and the metric for the SNR. For example, the logic condition may be: the metric for the signals is greater than the first threshold and the metric for the data rate is greater than the second threshold, or the metric for the signals is greater than the first threshold and the metric for the SNR is less than the third threshold.

If the electronic device determines not to transition to the second power state (operation 216), the electronic device continues to detect the data using the first receiver (operation 212). Otherwise (operation 216), the electronic device detects the data in the signals using a second receiver (operation 218) and calculates the metrics (operation 214).

After transitioning to the second power state, detecting (operation 218) and calculating (operation 214), the electronic device subsequently determines whether to transition the electronic device (operation 220) from the second power state to the first power state by switching from the second receiver circuit to the first receiver circuit based on a second logic condition. The second logic condition may be based on: the metric for the signals, or the metric for the data rate and the metric for the SNR. For example, the second logic condition may be: the metric for the signals is less than the first threshold, or the metric for the data rate is less than the second threshold and the metric for the SNR is greater than a fourth threshold. Note that using the fourth threshold instead of the third threshold may provide hysteresis in transitions between the first power state and the second power state.

If the electronic device determines not to transition to the first power state (operation 220), the electronic device continues to detect the data using the second receiver (operation 218). Otherwise (operation 220), the electronic device detects the data in the signals using the first receiver (operation 212).

In some embodiments of method 200, there may be additional or fewer operations. For example, the baseline receiver may or may not be turned off when the electronic device transitions to the second power state. However, the advanced receiver may be turned off when the electronic device transitions to the first power state. Moreover, the order of the operations may be changed, and/or two or more operations may be combined into a single operation.

We now describe exemplary embodiments of the communication technique. In these embodiments, the HSDPA data-scheduling ratio is computed from high-speed shared-control channel (HS-SCCH) reception. For example, an activity detector may be used in an 80 ms window to detect activity. Activity may indicate a high value of the HSDPA data scheduling and inactivity may indicate a low value of the HSDPA data scheduling (i.e., a low value of the metric for the data rate), which indicates that the receiver will be sitting idle for a majority of the time slots. Moreover, the SNR may be determined using a common pilot channel (CPICH). In particular, the received pilot power from a base station divided by measured noise over the operating bandwidth may be used to determine the CPICH_SNR (i.e., the metric for the SNR).

Furthermore, interference may be assessed based on a number of instances of in-cell multi-path signals (based on the delay spread) and/or a number of instances of neighboring-cell signals (which may be detected based on the CPICH associated with these cells). Thus, the presence of some interference (i.e., a high value for the metric for the signals) may be associated with at least two instances of in-cell multi-path signals, two instances of neighboring-cell signals, or both.

The logic condition may be used to enable the advanced receiver when it is needed. For example, the logic condition may be: the presence of some interference AND (high HSDPA data scheduling OR a CPICH_SNR less than 9 dB). Similarly, the second logic condition may be used to disable the advanced receiver when it is not needed, such as when it provides little or no advantage over the baseline receiver.

For example, the second logic condition may be: little or no interference (i.e., a low value of the metric for the signals) OR (low HSDPA data scheduling AND a CPICH_SNR greater than 10 dB).

In the case of the interference component in the logic condition and the second logic condition, if the electronic device is in a cell with minimum or no multi-path interference (the delay spread is fairly small), then an advanced receiver may not be needed because there are little to no signals that need to be cancelled out in order to obtain the desired signal. In most cases when the delay spread is small, the baseline receiver does a good enough job acquiring the signal. Furthermore, if the signal strength of neighboring cells is fairly small such that they are not causing problems with the baseline receiver, then there is typically little utility in trying to cancel out the neighboring-cell signals.

Note that, when the electronic device 'wakes' from an idle mode, there may not be enough information available to the electronic device for it to know whether or not to operate the advanced receiver. For example, in many instances, the electronic device may wake from the idle mode simply to send a control packet notifying a service that the electronic device is still 'alive,' and then return to the idle mode. Thus, when an electronic device wakes from the idle mode, it may wake in the first (lower) power state. Moreover, for better battery performance, the baseline receiver may be initially used when high-speed data communication starts. Furthermore, when channel conditions are poor (as indicated by the logic condition), the estimation results that are used for making a decision may be unreliable. Therefore, in these instances the advanced receiver may be used.

Figure 3:
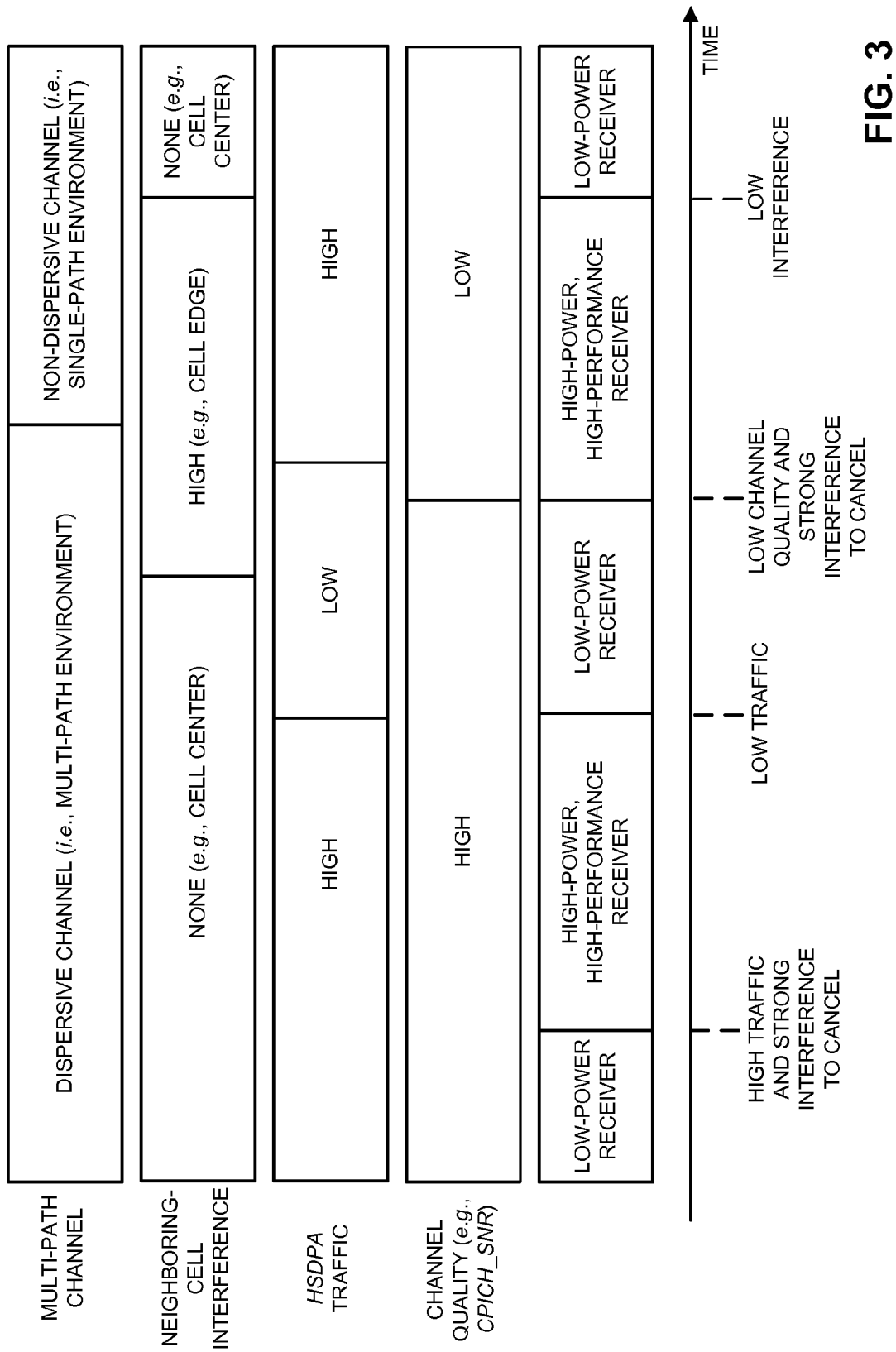
FIG. 3 is a timing diagram illustrating the method of FIG. 2 in accordance with an embodiment of the present disclosure.

FIG. 3 presents a timing diagram illustrating receiver selection over time using method 200 (FIG. 2). In FIG. 3, the electronic device initially wakes up from an idle mode or state. Thus, at the bottom left of FIG. 3, the electronic device starts out using the low-power receiver. Once enough information is gathered to determine that the electronic device is in a dispersive channel with high HSDPA data-scheduling traffic, then the electronic device enables the high-power, high-performance receiver.

Subsequently, when the electronic device encounters a low amount of HSDPA data-scheduling traffic, the electronic device can save power with negligible effect on communication performance by disabling the high-power, high-performance receiver. Next, when the channel quality of the channel that the electronic device is communicating on drops below a predetermined threshold, the electronic device enables the high-power, high-performance receiver again to improve the communication performance. Furthermore, when the background interference from neighboring cells disappears or falls below a predetermined threshold, the electronic device disables the high-power, high-performance receiver.

Thus, the described embodiments of the communication technique conserve battery power by disabling the high-power, high-performance receiver in certain instances where there is little to no communication-performance gain when utilizing the high-power, high-performance receiver over utilizing the low-power baseline receiver. In these ways, the communication technique may be used to maintain communication performance while reducing power consumption of an electronic device.

We now describe embodiments of the electronic device. FIG. 4 presents a block diagram illustrating an electronic device 400. This electronic device includes processing subsystem 410, memory subsystem 412, and networking subsystem 414 with communication circuit 418. As described below with reference to FIG. 5, communication circuit 418 includes two receivers, including a baseline receiver (B.R.) 406 and an advanced receiver (A.R.) 408. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as power-management module 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured, to be executed by processing subsystem 410. Note that power-management module 424 may include software and/or firmware.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, a communication circuit 418 and an antenna 420. For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising frames and/or scanning for advertising frames transmitted by other electronic devices.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections between the subsystems.

In some embodiments, electronic device 400 includes a display subsystem 426 for displaying information on a display, which may include a display driver and the display, such as a liquid-crystal display, a touchscreen, etc.

Furthermore, as described previously, communication circuit 418 and/or power-management module 424 may perform the operations in method 200 (FIG. 2), including: receiving signals, calculating metrics, determining whether to switch from a lower power state to a higher power state by transitioning from baseline receiver 406 to advanced receiver 408 based on the logic condition and/or determining whether to switch from the higher power state to the lower power state by transitioning from advanced receiver 408 to baseline receiver 406 based on the second logic condition. Therefore, the communication technique may be implemented using hardware and/or software.

Figure 5:
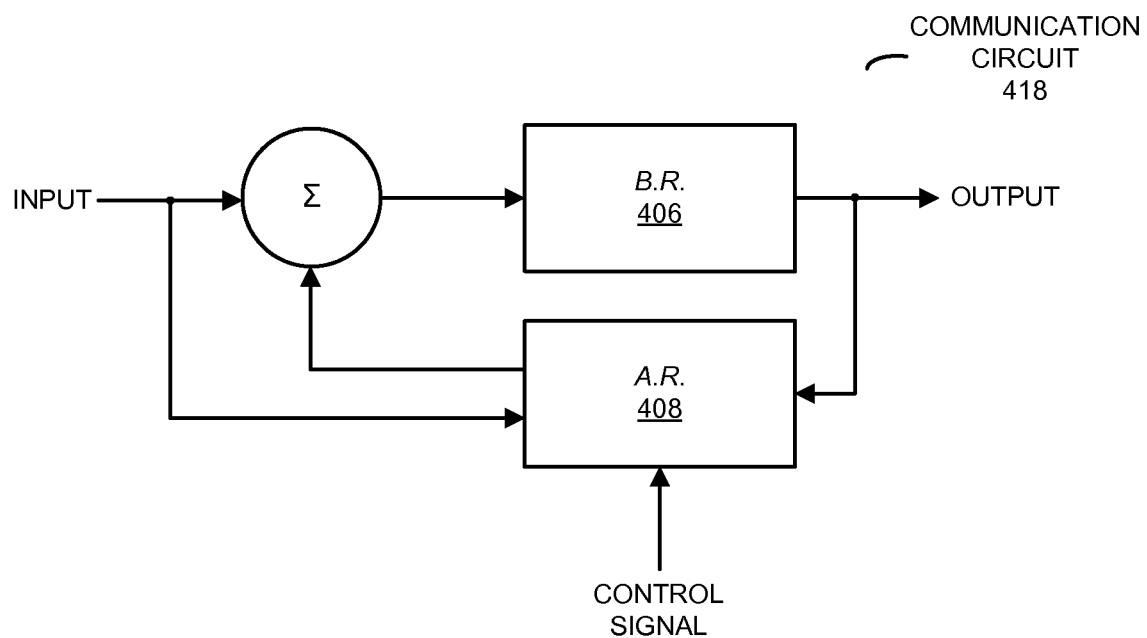
FIG. 5 is a block diagram illustrating a communication circuit in one of the electronic devices of FIG. 1 in accordance with an embodiment of the present disclosure.

FIG. 5 illustrates communication circuit 418, including baseline receiver 406, advanced receiver 408 and the use of a control signal (determined using the communication technique) to manage power consumption by dynamically transitioning between baseline receiver 406 and advanced receiver 408 based on network conditions and/or environmental conditions.

Referring back to FIG. 4, electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional instances of processing subsystem 410, memory subsystem 412, networking subsystem 414, and/or display subsystem 426. Additionally, one or more of the subsystems may not be present in electronic device 400. Moreover, in some embodiments, electronic device 400 may include one or more additional subsystems that are not shown in FIG. 4. For example, electronic device 400 can include, but is not limited to: a power subsystem (such as a battery), a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, power-management module 424 may be included in operating system 422.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as communication circuit 418. Moreover, the integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

An output of a process for designing the integrated circuit, or a portion of the integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a data rate associated with HSDPA data scheduling was used as an illustrative example of a network condition, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures.

Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna; and
   a communication circuit, coupled to the antenna, configured to communicate information via wireless communication, wherein the communication circuit includes:
   a first receiver circuit configured to detect data in received signals; and
   a second receiver circuit configured to detect the data in the received signals, wherein, during operation, the second receiver circuit has a larger power consumption than the first receiver circuit;
   wherein the electronic device is configured to calculate a metric for signals that interfere with the wireless communication, a metric for a data rate associated with the wireless communication, and a metric for a signal-to-noise ratio (SNR) associated with the wireless communication, wherein the metric for data rate is calculated based on an amount of downlink data scheduling that is detected during a corresponding measurement interval, and wherein the metric for the SNR is associated with a measured power of a pilot signal and a measured noise over an operating bandwidth in the wireless communication;
   wherein the electronic device is configured to determine whether to transition the electronic device from a first power state to a second power state by switching from the first receiver circuit to the second receiver circuit based on a logic condition; and
   wherein the logic condition is based on one of: the metric for the signals and the metric for the data rate, and the metric for the signals and the metric for the SNR.

2. The electronic device of claim 1, wherein the communication circuit is configured to calculate the metric for the signals, the metric for the data rate and the metric for the SNR, and to determine whether to transition the electronic device from the first power state to the second power state.

3. The electronic device of claim 1, wherein the electronic device further includes:
   a processor; and
   memory, wherein the memory stores a power-management program module, and wherein the power-management program module is configured to be executed by the processor to manage power consumption of the electronic device, the program module including:
   instructions for receiving the metric for the signals, the metric for the data rate, and the metric for the SNR; and
   instructions for determining whether to transition the electronic device from the first power state to the second power state.

4. The electronic device of claim 1, wherein the logic condition is based on one of: the metric for the signals is greater than a first threshold and the metric for the data rate is greater than a second threshold, and the metric for the signals is greater than the first threshold and the metric for the SNR is less than a third threshold.

5. The electronic device of claim 1, wherein the signals include one of:
   multi-path interference and neighboring-cell interference.

6. The electronic device of claim 1, wherein the second receiver circuit has improved communication performance than the first receiver circuit.

7. The electronic device of claim 1, wherein, if the electronic device transitions to the second power state, the electronic device is further configured to subsequently determine whether to transition the electronic device from the second power state to the first power state by switching from the second receiver circuit to the first receiver circuit based on a second logic condition; and
   wherein the second logic condition is based on one of: the metric for the signals, and the metric for the data rate and the metric for the SNR.

8. The electronic device of claim 7, wherein the second logic condition is based on one of: the metric for the signals is less than a first threshold, and the metric for the data rate is less than a second threshold and the metric for the SNR is greater than a third threshold.

9. The electronic device of claim 1, wherein the amount of HSDPA data scheduling is determined based at least in part on high-speed shared-control channel (HS-SCCH) reception.

10. An integrated circuit, comprising a communication circuit configured to process information for wireless communication, wherein the communication circuit includes:
   a node configured to couple to an antenna to communicate signals associated with the wireless communication;
   a first receiver circuit, coupled to the node, configured to detect data in received signals;
   a second receiver circuit configured to detect the data in the received signals, wherein, during operation, the second receiver circuit has a larger power consumption than the first receiver circuit; and
   an analysis circuit configured to calculate a metric for signals that interfere with the wireless communication, a metric for a data rate associated with the wireless communication, and a metric for a signal-to-noise ratio (SNR) associated with the wireless communication, wherein the metric for data rate is calculated based on an amount of downlink data scheduling that is detected during a corresponding measurement interval, and wherein the metric for the SNR is associated with a measured power of a pilot signal and a measured noise over an operating bandwidth in the wireless communication;
   wherein the integrated circuit is configured to determine whether to transition the integrated circuit from a first power state to a second power state by switching from the first receiver circuit to the second receiver circuit based on a logic condition; and wherein the logic condition is based on one of: the metric for the signals and the metric for the data rate, and the metric for the signals and the metric for the SNR.

11. The integrated circuit of claim 10, wherein the integrated circuit further includes:
a processor; and
memory, wherein the memory stores a power-management program module, and wherein the power-management program module is configured to be executed by the processor to manage power consumption of the integrated circuit, the program module including:
instructions for receiving the metric for the signals, the metric for the data rate, and the metric for the SNR; and
instructions for determining whether to transition the integrated circuit from the first power state to the second power state.

12. The integrated circuit of claim 10, wherein the logic condition is based on one of: the metric for the signals is greater than a first threshold and the metric for the data rate is greater than a second threshold, and the metric for the signals is greater than the first threshold and the metric for the SNR is less than a third threshold.

13. The integrated circuit of claim 10, wherein the signals include one of:
multi-path interference and neighboring-cell interference.

14. The integrated circuit of claim 10, wherein the second receiver circuit has improved communication performance than the first receiver circuit.

15. The integrated circuit of claim 10, wherein, if the integrated circuit transitions to the second power state, the integrated circuit is further configured to subsequently determine whether to transition the integrated circuit from the second power state to the first power state by switching from the second receiver circuit to the first receiver circuit based on a second logic condition; and wherein the second logic condition is based on one of: the metric for the signals, and the metric for the data rate and the metric for the SNR.

16. The integrated circuit of claim 15, wherein the second logic condition is based on one of: the metric for the signals is less than a first threshold, and the metric for the data rate is less than a second threshold and the metric for the SNR is greater than a third threshold.

17. A method for managing power consumption of an electronic device, wherein the method comprises:
receiving signals associated with wireless communication;
detecting data in the signals using a first receiver circuit;
calculating a metric for signals that interfere with the wireless communication, a metric for a data rate associated with the wireless communication, and a metric for a signal-to-noise ratio (SNR) associated with the wireless communication, wherein the metric for data rate is calculated based on an amount of downlink data scheduling that is detected during a corresponding measurement interval; wherein the metric for the SNR is calculated based on a power of a pilot signal received by the electronic device and a measured noise over an operating bandwidth; and
determining whether to transition the electronic device from a first power state to a second power state by switching from the first receiver circuit to a second receiver circuit based on a logic condition, wherein, during operation, the second receiver circuit has a larger power consumption than the first receiver circuit; and
wherein the logic condition is based on one of: the metric for the signals is greater than a first threshold and the metric for the data rate is greater than a second threshold, and the metric for the signals is greater than the first threshold and the metric for the SNR is less than a third threshold.

* * * * *